United States Patent [19]
Isoda et al.

[11] Patent Number: 5,570,457
[45] Date of Patent: Oct. 29, 1996

[54] VISUAL INFORMATION PROCESSING DEVICE

[75] Inventors: Satoru Isoda; Yoshio Hanazato; Satoshi Ueyama; Hiroaki Kawakubo; Satoshi Nishikawa, all of Hyogo-ken, Japan

[73] Assignee: Mitsubishi Denki Kabushiki Kaisha, Tokyo, Japan

[21] Appl. No.: 441,627

[22] Filed: May 15, 1995

Related U.S. Application Data

[62] Division of Ser. No. 727,991, Jul. 10, 1991, Pat. No. 5,416,891.

[30] Foreign Application Priority Data

Jul. 10, 1990 [JP] Japan .................................. 2-184525

[51] Int. Cl.$^6$ .............................. G06G 7/16; H01L 31/08
[52] U.S. Cl. .............................. 395/25; 364/822; 364/807
[58] Field of Search .............................. 395/25; 364/822, 364/807

[56] References Cited

U.S. PATENT DOCUMENTS

| | | | |
|---|---|---|---|
| 4,760,437 | 7/1988 | Denker et al. | 395/25 |
| 4,766,471 | 8/1988 | Ovshinsky et al. | 357/19 |
| 4,988,891 | 1/1991 | Mashiko | 395/25 |
| 4,999,688 | 3/1991 | Hara et al. | 357/19 |
| 5,003,360 | 3/1991 | Okada et al. | 357/22 |
| 5,014,096 | 5/1991 | Matsuda et al. | 357/19 |
| 5,028,969 | 7/1991 | Kasahara et al. | 357/19 |
| 5,093,875 | 3/1992 | Ogura et al. | 385/17 |
| 5,129,040 | 7/1992 | Hanazato et al. | 395/25 |
| 5,159,603 | 10/1992 | Kim | 395/25 |
| 5,229,623 | 7/1993 | Tanoue et al. | 257/25 |
| 5,388,187 | 2/1995 | Isoda et al. | 395/25 |

OTHER PUBLICATIONS

Nikkei High Tech Report vol. IV, No. 14, 22 May 1989, London GB, p. 11—Mitsubishi "Biodevice uses protein conductivity" *p. 11, left col., line 1—middle col., line 3*.

C. Koch, "Computing Motion in the Presence of Discontinuities: Algorithm and Analog Networks", NATO ASI Series, vol. F41, Neural Computers, Berlin (1988), pp. 101–110.

Hopfield, "Computing with Neural Circuits; A Model", Science, vol. 233, Aug. 1986.

Electronics Engineers' Handbook, Donald G. Fink, First Edition 1975.

J. Ohta et al., "GaAs/AlGaAs optical synaptic interconnection device for neural networks", Aug. 15, 1989, vol. 14, No. 16 Optic Letters, Optical Society of America.

(List continued on next page.)

*Primary Examiner*—George B. Davis
*Attorney, Agent, or Firm*—Wolf, Greenfield & Sacks, P.C.

[57] ABSTRACT

A visual information processing device having a neural network function and capable of visual information processing comprises a semiconductor integrated circuit section equipped with a plurality of neuronic circuit regions realizing a neuron function included in the neural network function, and first and second molecular film sections provided on the integrated circuit section. The first molecular film section comprises a light-receiving molecular film section including Tij input elements having a photoelectric function and to which coupling strength levels (Tij) between the plurality of neuronic circuit regions are optically written to realize electric connection between the neuronic circuit regions and image input elements for sensing visual images, each neuronic circuit region corresponding to one pixel. The second molecular film section comprises a light-emitting molecular film section including Tij signal output elements having a light emitting function to output Tij matrix signals as matrix light emission patterns.

10 Claims, 5 Drawing Sheets

OTHER PUBLICATIONS

B. W. Lee and B. J. Sheu, "An Investigation on Local Minima of Hopfield Network for Optimization of Cirucits", IEEE Int'l Conference on Neural Networks, 7/24–27/88, pp. I–46 to I–51.

C. D. Kornfeld et al., "An Optically Programmed Neural Network", IEEE Int'l Conference On Neural Networks, 7/24–27/88, pp. II–358 to II–364.

H. Yonezu et al., "An Optoelectronic Synaptic Connection Circuit with Variable Analog and Nonvolatile Weights", 29 Jul. 1990, No. 7, Part 2, Tokyo, JP, 362 Japanese Journal of Applied Physics.

C. A. Mead, "A Silicon Model of Early Visual Processing", Neural Networks, vol. 1, 1988, pp. 91–97.

VISUAL INFORMATION PROCESSING DEVICE

This application is a division of application Ser. No. 07/727,991 filed on Jul. 10, 1991, U.S. Pat. No. 5,416,891.

BACKGROUND OF THE INVENTION

1. Field of the Invention

The present invention relates to a high speed visual information processing device comprising both an image sensor section capable of sensing a visual image and a neural information processing section adapted to perform parallel processing on a visual image signal and which is capable of parallel transfer of a visual image signal from the image sensor section to the neural information processing section.

2. Prior Art

FIG. 1 is a block diagram showing a general construction of a conventional visual information processing system. In the drawing, an image signal sensor section 1 and an image signal processing section 3 are connected to each other through an image signal transmission section 2. The image signal carries two-dimensional information in the X- and Y-directions. In the case of a moving image wherein information changes with passage of time, image signals entered to respective pixels of the image sensor section 1 have to be read out at a fixed period before they are transmitted to the image signal processing section 3. Given the number of pixels contained in image signals and the type of signal processing method, signal processing speed of this visual information processing system are determined by the following factors:

(1) The speed at which all (x, y) signal are written to the image sensor section (the speed of response);

(2) The speed at which the signals having been written to the image sensor section are read out;

(3) The speed at which the transmitted signals are written to the signal processing section; and (4) The speed at which signals are processed in the signal processing section.

Thus, with an above-described type of visual information processing system which employs silicon CCDs as the image sensor and a serial arithmetic CPU as the signal processing section, transmission and processing of signals are very slow due to the serial processing, so that, in many cases, it may be impossible to effect a real time pattern recognition (of visual information processing within a period of about 30 msec).

FIG. 2 shows a three-dimensional resistor network for optical flow calculation shown, for example, on page 101 of "Neural Computers" by K. Koch, et al. (Berlin, 1988). In the drawing, the reference numeral 4 indicates an equivalent circuit simulating a photovoltaic device, such as photodiode, irradiated with light. This equivalent circuit 4 includes a voltage source 5 and a capacitor 6, and a resistor 7 both present in the equivalent circuit. The reference numerals 8 and 9 indicate upper and lower contacts in the three-dimensional resistor network; 10 indicates a resistor connecting the upper and lower contacts 8 and 9 to each other; 11 indicates resistors interconnecting the contacts 8 in the upper layer and the contacts 9 in the lower layer; and 12 indicates switches provided in these resistors 11.

The operation of this resistor network will be described. Visual information on an object obtained from the photodiode is simultaneously supplied to the contacts of the three-dimensional resistor network at fixed time intervals. A movement of the object causes a change in the light signal, thereby causing changes in voltage at the contacts 8 and 9. Thus, the network system, which has been stable, is disturbed to proceed to a new phase of stability. From the values of voltage at the contacts 8 and 9 which have attained a stable condition, two-dimensional velocity vectors in the X- and Y-directions can be obtained. The switches 12 prevent the contour of the object in the image from being blurred in this process, allowing the contour to be formed at reasonable positions.

Regarding the conventional visual image information processing device being constructed such as described above, it is quite difficult to form an image sensor section, such as a photodiode, and an image signal processing section in one and the same device so as to effect a parallel transmission of image signals. Further, it is difficult to build up a three-dimensional resistor network, such as an optical flow, within a conventional semiconductor device.

SUMMARY OF THE INVENTION

The present invention has been made in view of solving the above problems. It is accordingly an object of the invention to provide a visual information processing device which is so designed that an image sensor section and a signal processing section having a neural information processing function that is adapted to perform parallel information processing are formed in one and the same device, a device in which a parallel signal transmission is effected between the image sensor section and the signal processing section.

In accordance with the invention, there is provided a visual information processing device comprising a semiconductor integrated circuit section including a plurality of neurons, and first and second molecular film sections provided on the integrated circuit section. The first molecular film section includes image input elements which have a photoelectric function, where each element corresponds to one neuron, and Tij signal input elements which couple each neuron with other neurons. The second molecular film section has a light-emitting function and is adapted to transmit Tij matrix light signals to the Tij signal input elements. The visual information processing device is thus formed as a hybrid device comprising the molecular film sections and the semiconductor integrated circuit section.

In a visual information processing device of the present invention, a molecular film section having a photoelectric function includes image sensor elements and Tij signal input elements and a molecular film section having a light-emitting function includes Tij light signal output elements, these molecular film sections being formed three-dimensionally on a semiconductor circuit in a neuron section. By virtue of this construction, image signals can be transmitted to an image signal processing section in parallel. This means that a neural information processing system, which is one of the parallel information processing systems, can be adopted as a signal processing system for the signal processing section. A Tij matrix pattern, a pattern of wiring neurons of the neural information processing system, can be changed since such a pattern is input by means of a light pattern generated within the device.

Further, the molecular films are formed in a multilayer structure on the semiconductor integrated circuit in which neuronic circuit regions are arranged in matrix, so that the number of wiring lines for forming the Tij couplings can be reduced, thereby making it possible to augment the number of neurons, i.e. pixels, that can be integrated.

DETAILED DESCRIPTION OF THE PREFERRED EMBODIMENTS

Figure 1:
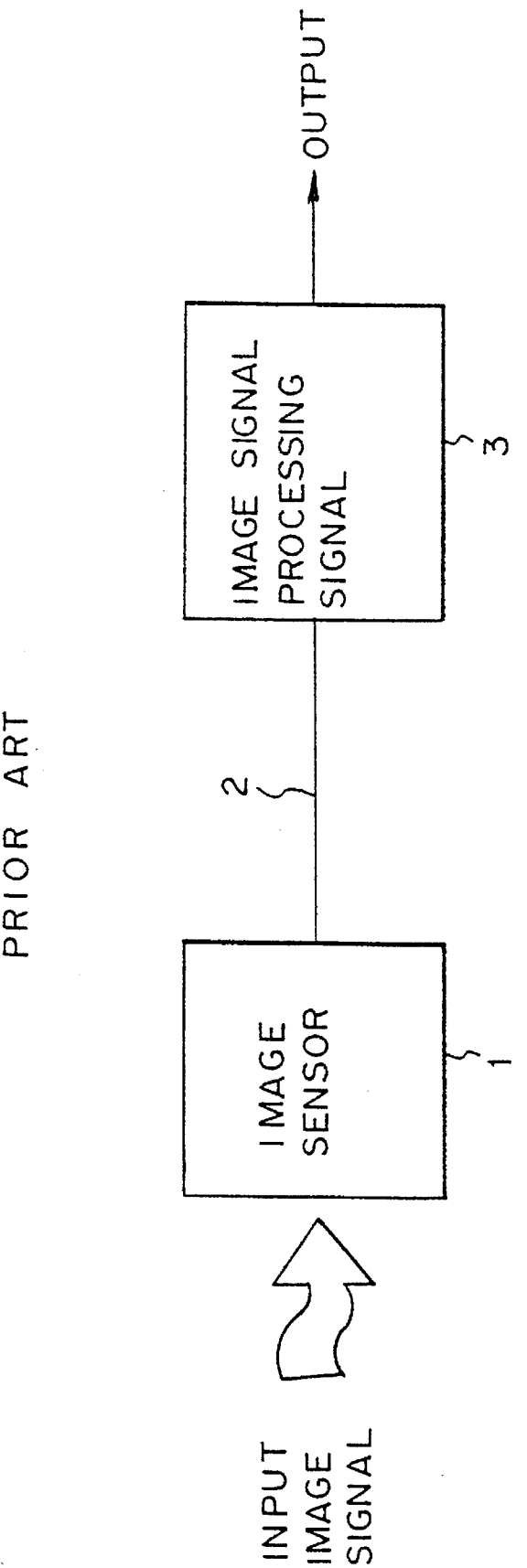
FIGS. 1 and 2, respectively, illustrate a conventional visual information processing system and a visual information processing device used therein.
Figure 2:
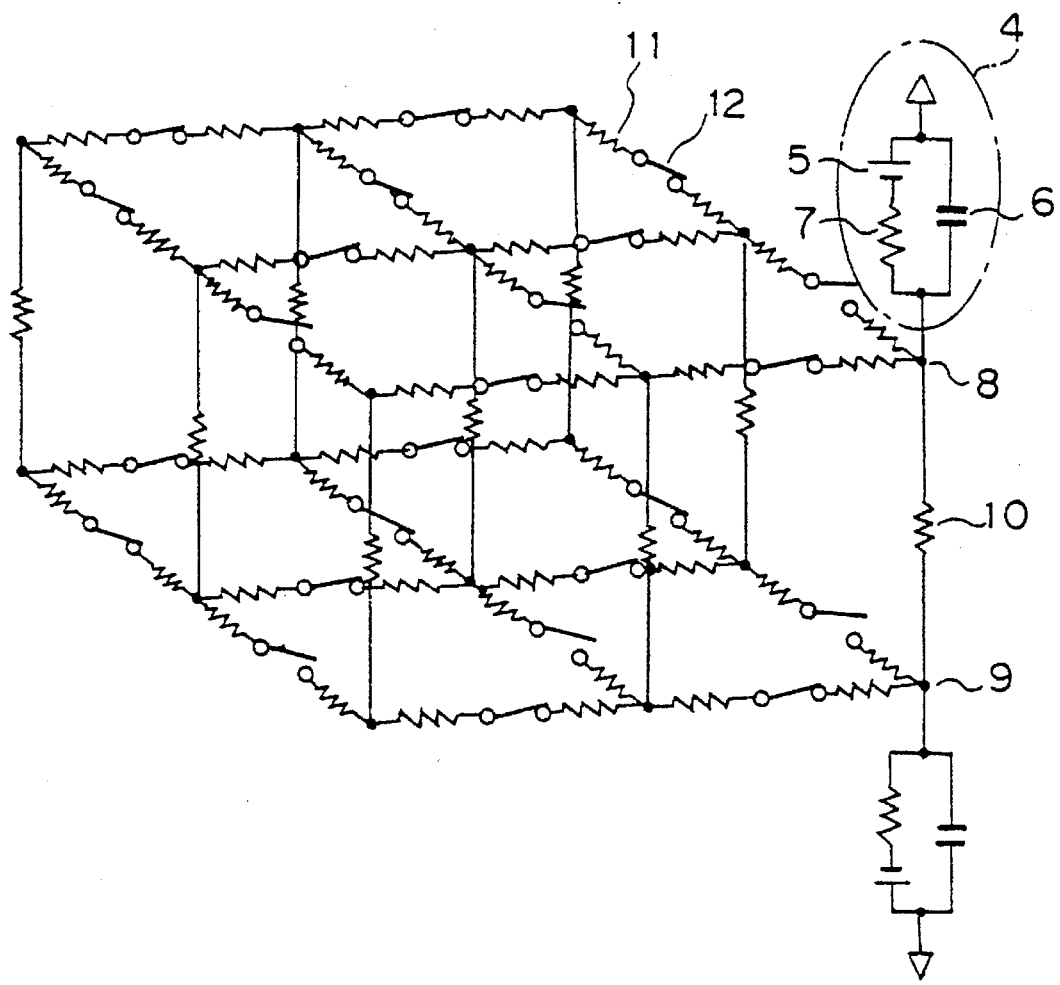
Figure 3A:
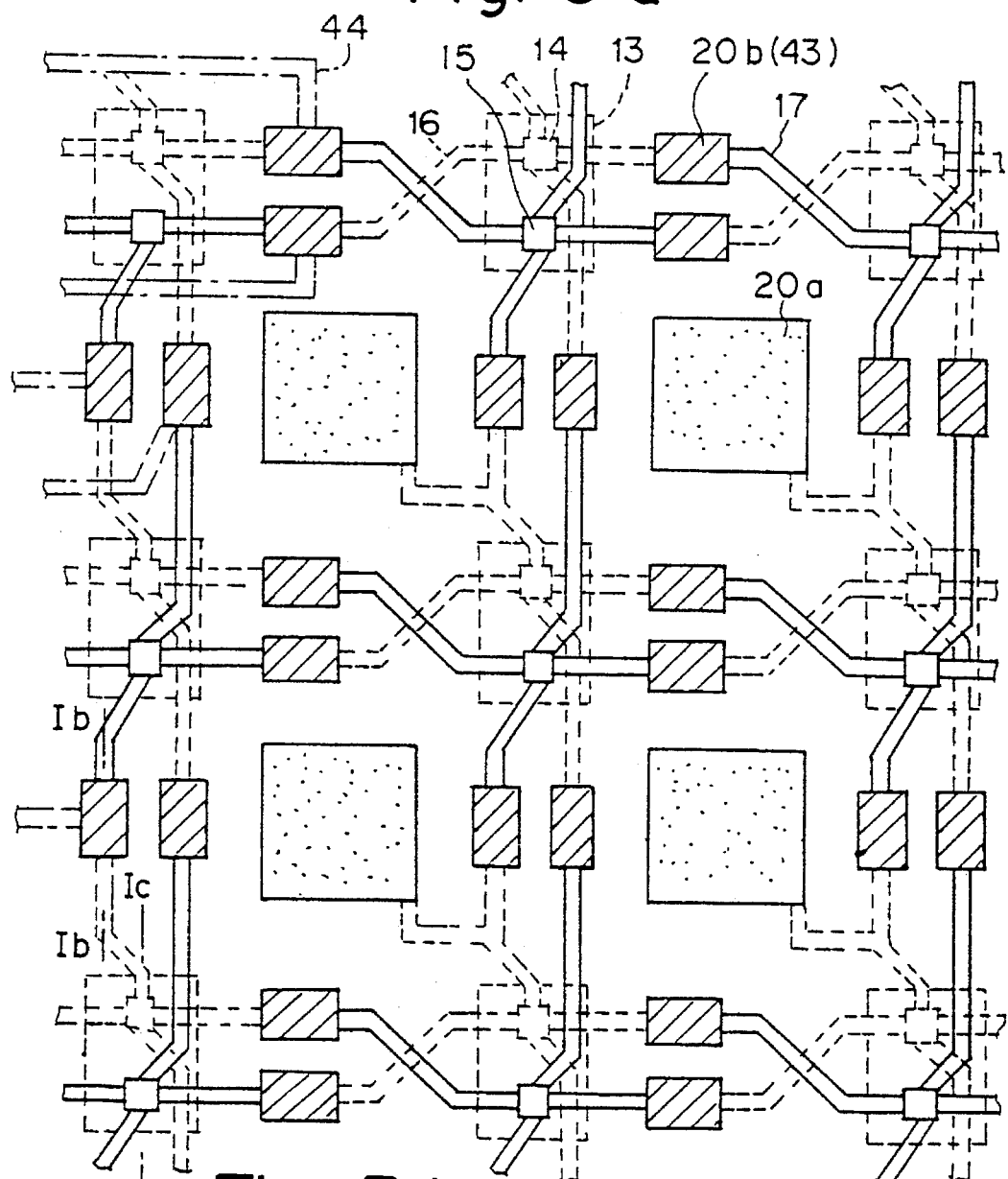
FIGS. 3(a), 3(b) and 3(c) are diagrams showing a visual information processing device in accordance with an embodiment of this invention.
Figure 3B:
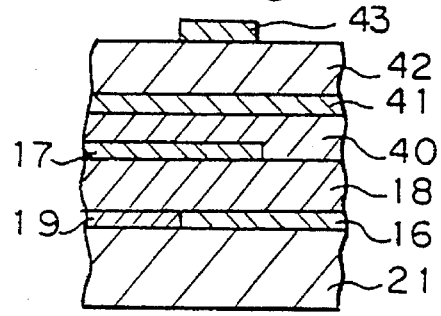
Figure 3C:
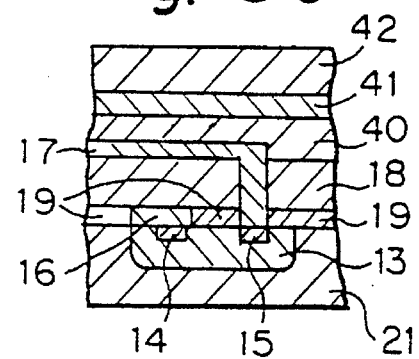

FIG. 3(a) is a plan view showing a visual information processing device in accordance with an embodiment of this invention, and FIGS. 3(b) and 3(c) are sectional views taken along the lines Ib—Ib and Ic—Ic, respectively, of FIG. 3(a). The visual information processing device shown includes a silicon substrate 21, on which an integrated circuit is formed. Formed in this silicon substrate 21 are neuronic circuit regions (hereinafter referred to simply as "neurons") 13. Each neuron (nerve cell) 13 is equipped with an input terminal 14 and an output terminal 15 and includes a molecular film 18 having a photoelectric function and formed on the semiconductor integrated circuit device 21. Input wiring lines 16 are formed between this molecular film 18 and the semiconductor integrated circuit device, and output wiring lines 17 are formed on the molecular film 18. The upper surface of the semiconductor integrated circuit device 21 is coated with an insulating film 19. Images enter to sections (image input sections) 20a. Tij signals, which indicate the strength levels of synaptic junction between inputs and outputs of adjacent neurons, enter to sections (Tij signal input sections) 20b. A transparent insulating film 40 is formed on the output wiring lines 17 and the molecular film 18. Formed on this transparent insulating film 40 is a transparent electrode 41 for light, emitting elements. Formed on this transparent electrode 41 is a molecular film 42 having a light-emitting function, on which are formed electrodes 43 for the light-emitting elements. Lead wires 44 for the electrodes, only a part of which is shown in FIG. 3(a) for simplicity, are connected to all the electrodes 43.

A method of producing the device of this embodiment will be described next.

The input wiring lines 16 are formed by vacuum evaporation of aluminum and photolithography. The output wiring lines 17 are formed as semitransparent aluminum electrodes by, likewise, vacuum evaporation of aluminum and photolithography. It may be possible for the output electrodes 17 to be formed as transparent electrodes using such materials as ITO and nesa glass. The molecular film 18 is formed by depositing a porphyrin derivative in a thickness of several molecular layers by the Langmuir-Blodgett method and depositing thereon a flavin derivative of a thickness of several molecular layers by the LB method. This molecular film 18 has a property of changing a current flowing between the electrodes in accordance with the intensity of light impinging thereon. The transparent insulating film 40 is formed of $SiO_2$, a high polymer film, etc. The transparent electrode 41 is formed of such material as ITO and nesa glass. The light-emitting molecular film 42 has a three-layer structure composed of a hole-transporting film. a light-emitting film and an electron-transporting film stacked together in this order on the transparent electrode 41. The electrodes 43 may consist of Mg electrodes, and the lead wires 44 may be formed of aluminum. The neurons 13 are formed in the integrated circuit device by using resistors, capacitors and transistors in combination by a conventional LSI technique.

This embodiment adopts only one layer of molecular film having a photoelectric function, so that the number of pixels and that of wiring lines are limited. This problem may be basically solved by forming a multilayer-structured molecular film section.

Figure 4A:
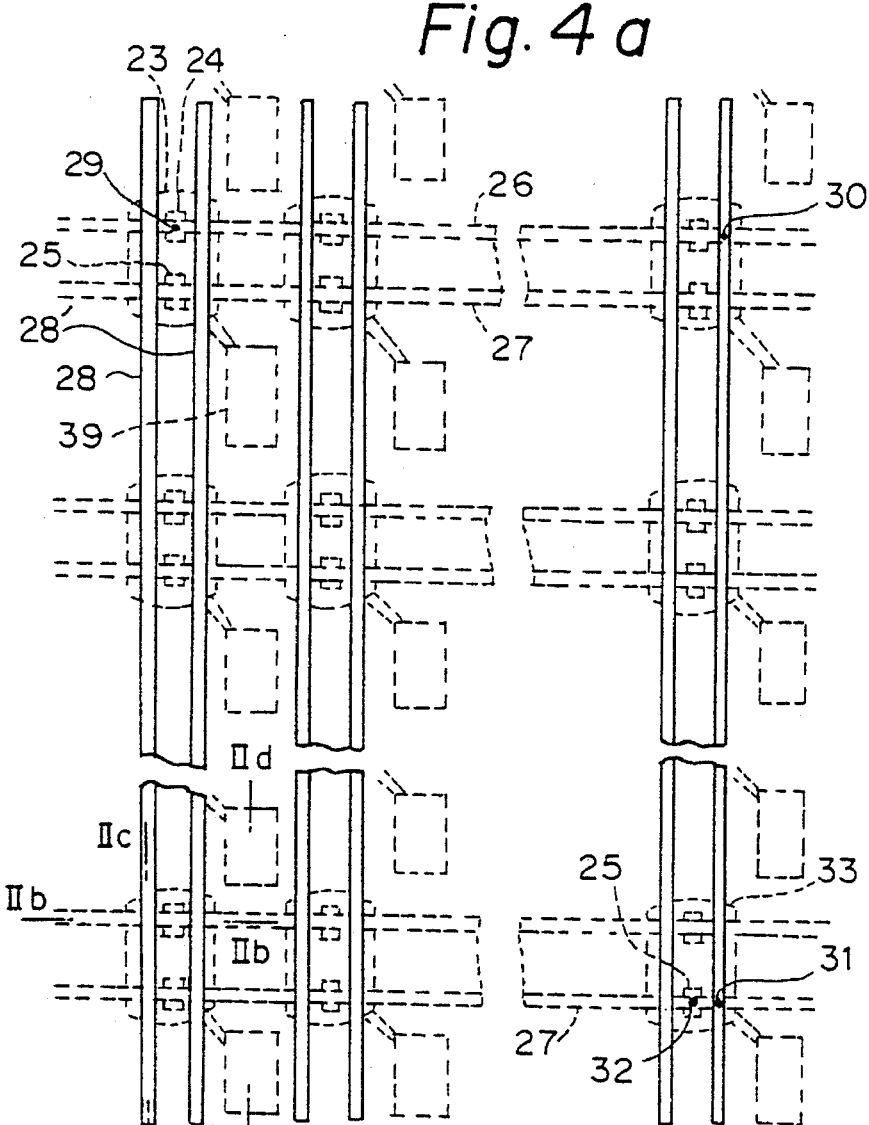
FIGS. 4(a), 4(b), 4(c) and 4(d) are diagrams showing a visual information processing device in accordance with another embodiment of this invention.
Figure 4B:
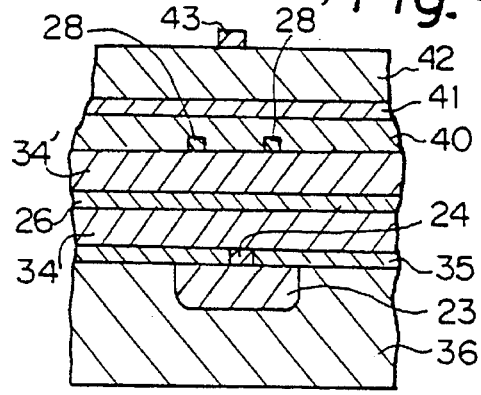
Figure 4C:
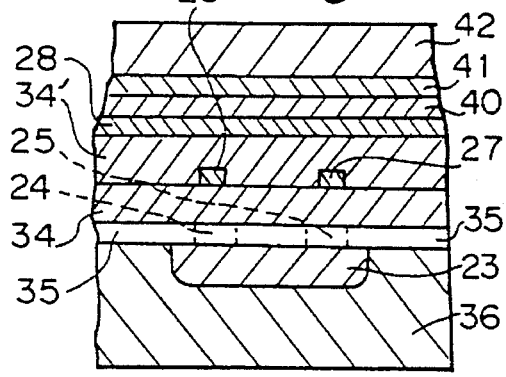
Figure 4D:
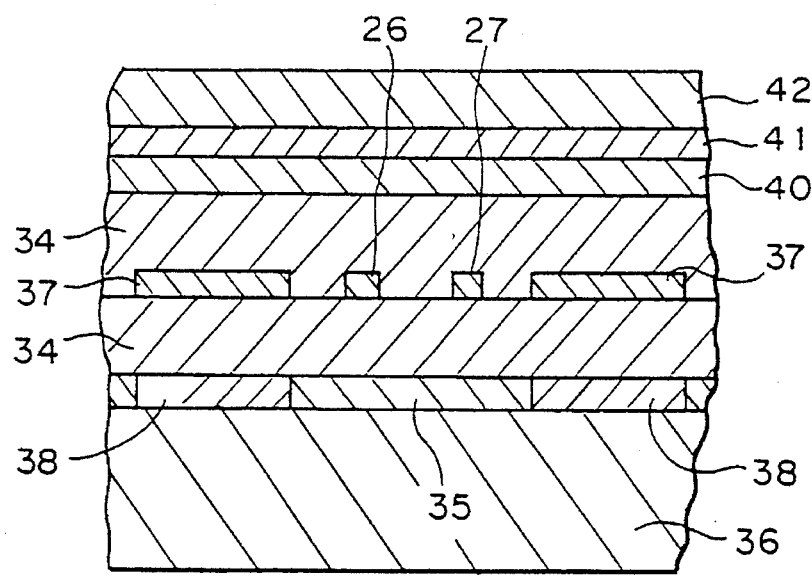

FIGS. 4(a) to 4(d) show a visual information processing device in accordance with another embodiment of the present invention. FIG. 4(a) is a plan view of the device of this embodiment, and FIGS. 4(b) through 4(d) are sectional views taken along the lines IIb—IIb, IIc—IIc, and IId—IId, respectively, of FIG. 4(a).

Neurons 23, which are formed of analog or digital circuits in such a manner as to simulate the neuronic operation in a living body, are arranged in matrix in a silicon substrate 36 by using integrated-circuit technique. Then, by a predetermined vacuum evaporation method, metallic sections, such as output and input electrodes 24 and 25 of the neurons, are formed on the integrated circuit. The remaining surface of the integrated circuit where no electrodes are formed are covered with an $SiO_2$ film 35 or the like, thereby leveling the circuit surface. Subsequently, electrodes are formed on this integrated circuit for the purpose of forming a first layer of molecular film 34 on this wafer by the Langmuir-Blodgett method in the same manner as in the case of the device shown in FIGS. 3(a) to 3(c). Semitransparent aluminum wiring lines 26 and 27 are formed on this first layer of molecular film 34 in such a manner as to extend directly above the output electrodes 24 and the input electrodes 25 of the neurons 23 aligned in the lateral direction. A second layer of molecular film 34' is then formed on the first layer of molecular film 34 in the same manner as the first layer of molecular film. Then, semitransparent aluminum electrodes 28 and 28', two for each neuron, are formed on the second layer of molecular film 34' in such a manner as not to overlap the output and input electrodes 24 and 25 of the neurons 23 aligned in the longitudinal direction. The reference numeral 39 indicates image input sections, and the reference numerals 37 and 38 indicate upper and lower electrodes for image input. Light emitting elements 40 through 43 are formed in the same manner as in the embodiment shown in FIGS. 3(a) to 3(c).

Next, the operation of the above device will be described. In FIG. 4(a), the output of the neuron 23 in the upper left corner and the input of the neuron 33 in the right bottom corner are connected to each other in the following manner. A plurality of rays of light irradiate those sections of the device shown in FIG. 4(a) where neuron electrodes and wiring lines cross each other. When, for example, an intersection 29 of the output electrode 24 of the upper left neuron 23 and the wiring line 26 formed on the first layer is irradiated with light, this output electrode 24 and this wiring line 26 are electrically interconnected, thus transferring an electrical signal on the output electrode 24 to the wiring line 26 on the first layer. Then, when an intersection 30 of the wiring line 26 formed on the first layer and the wiring line 28 formed on the second layer and passing above the neuron 33 is irradiated with light, the wiring line 26 and the wiring line 28 are electrically interconnected, thus transferring the electrical signal on the wiring line 26 transferred from the output electrode 24 to the wiring line 28 on the second layer. Subsequently, when an intersection 31 on the wiring line 28 on the second layer and the wiring line 27 which is formed on the first film and extends just above the input electrode 25 of the neuron 33 in the right bottom corner is irradiated with light, the wiring line 28 on the second layer and the wiring line 27 are electrically interconnected, thereby transferring the electrical signal on the output electrode 24 of the neuron 23 to the wiring line 27. Finally, when an intersection 32 of the wiring line 27 and the input electrode 25 of the neuron 33 is irradiated with light, the wiring line 27 and the input electrode 25 are electrically interconnected, thus allowing the electrical signal on the output electrode 24 of the neuron 23 to be transferred to the input electrode 25 of the neuron 33.

By simultaneously irradiating four intersections 29, 30, 31 and 32 with light, the output of the neuron 23 can be coupled to the input of the neuron 33. Such a coupling relationship can be applied to other neurons, thus making it possible to express input/output couplings between all the neurons.

Figure 5:
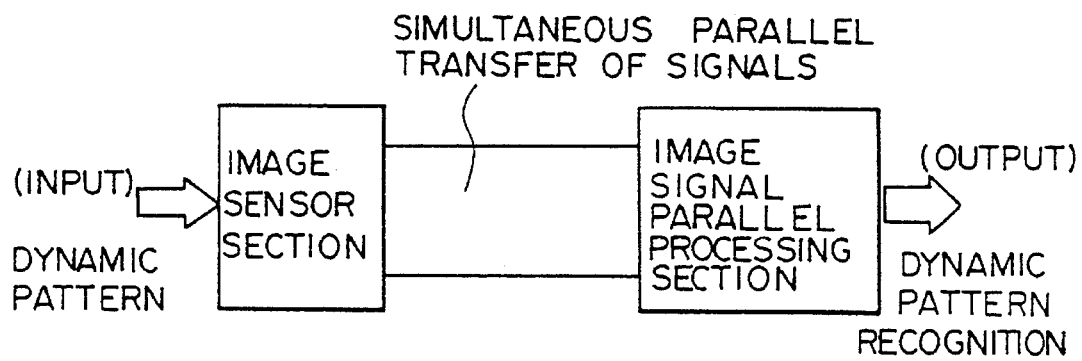
FIG. 5 is a diagram showing a visual information processing system using a visual information processing device in accordance with an embodiment of this invention.

FIG. 5 is a functional block diagram showing a visual information processing system using a visual information processing device in accordance with the present invention.

As shown in FIG. 5, using a visual information processing device in accordance with the embodiment shown in FIG. 3 or 4 makes it possible to realize a visual information processing system capable of parallel information processing.

By adopting molecular films having a photoelectric function with a wide spectral-sensitivity-wavelength band as molecular film elements, rays of light with different wavelengths can be used as a visual image signal and Tij signals, so that the desired Tij can be realized, thus making it possible to realize a visual information processing system capable of high speed processing of visual information.

Thus, according to the invention, image sensor sections and Tij sections are formed by molecular film sections having photoelectric functions, the molecular film sections being formed in a three-dimensional multilayer structure on a semiconductor integrated circuit in the neuron section. Accordingly, one and the same device can possess both an image sensor function and a neuron function, and Tij signals can be written by means of matrix-type light-emitting elements within the device. As a result, visual image signals can be parallelly transferred from the image sensor sections to the neurons which constitute a neural information processing section, thereby making it possible to perform a neural information processing with a high level Tij function. Thus, an ultra-high-speed visual information processing device can be realized.

What is claimed is:

1. A visual information processing device comprising:

a semiconductor integrated circuit section including N×M neuronic circuit regions that form a matrix, said neuronic circuit regions each having an input electrode and an output electrode;

a first photoelectric molecular film is disposed on said semiconductor integrated circuit section, wherein said first photoelectric molecular film has image input elements;

2N first transparent wiring lines are extended in a first direction on said first photoelectric molecular film such that each line extends above an output or an input electrode of M neuronic circuit regions;

a second photoelectric molecular film is disposed on said first photoelectric molecular film;

2M second transparent wiring lines are extended in a second direction on said second photoelectric molecular film so as to extend above each of N neuronic circuit regions without extending above the output and input electrodes of N neuronic circuit regions;

a transparent insulating layer is disposed on said second photoelectric molecular film and said second transparent wiring lines;

a transparent electrode is disposed on said transparent insulating layer;

a light-emitting molecular film is disposed on said first transparent electrode;

6×N×M electrodes are disposed on said light-emitting molecular film and at intersections of the output or input electrodes of said neuronic circuit regions and said first transparent wiring lines and at intersections of said first transparent wiring lines and said second transparent wiring lines;

lead wires are connected to said 6×N×M electrodes;

wherein light emitted from said light-emitting molecular film irradiates said intersections of the output or input electrodes of said neuronic circuit regions and said first transparent wiring lines, and said intersections of said first transparent wiring lines and said second transparent wiring lines, whereby coupling strength between said N×M neuronic circuit regions is controlled.

2. A visual information processing device as in claim 1, wherein said first photoelectric molecular film comprises a prophyrin derivative in a thickness of several molecular layers and a flavin derivative in a thickness of several molecular layers are disposed on said porphyrin derivative layers.

3. A visual information processing device as recited in claim 1, wherein said second photoelectric molecular film comprises a porphyrin derivative in a thickness of several molecular layers and a flavin derivative in a thickness of several molecular layers are disposed on said porphyrin derivative layers.

4. A visual information processing device as in claim 1, wherein said light-emitting molecular film comprises a hole-transporting film, a light-emitting film provided on said hole-transporting film and an electron-transporting film are disposed on said light-emitting film.

5. A visual image processing device as in claim 1, wherein said neuronic circuit regions are formed as analog or digital circuits.

6. A visual image processing device as in claim 1, further comprising a plurality of image input elements each coupled to one of said neuronic circuit regions.

7. A visual information processing device comprising:

a semiconductor integrated circuit device section having a surface and including a plurality of neuronic circuit regions that form a matrix;

a substantially planar, multi-layer molecular film on said semiconductor integrated circuit device section surface including a light-emitting film, at least one photoelectric film, and a plurality of wiring lines electrically connectible to some of said neuronic circuit regions;

a first junction comprising an output electrode of a first neuronic circuit regions, a first wiring line, and a portion of said at least one photoelectric molecular film between said output electrode and said first wiring line;

a second junction comprising an input electrode of a second neuronic circuit region, a second wiring line electrically connectible to said first wiring line, and a portion of said at least one photoelectric film between said input electrode and said second wiring line;

a first light-emitter including a first electrode, a second electrode and a portion of said light-emitting film between said first electrode and said second electrode;

a second light-emitter including a third electrode, a fourth electrode and a portion of said light-emitting film between said third electrode and said fourth electrode;

a first optical path between said first light-emitter and said first junction; and a second optical path between said second light-emitter and said second junction, wherein said output electrode of said first neuronic circuit region and said input electrode of said second neuronic circuit region are electrically connected when said first wiring line is electrically connected to said second wiring line, said first light-emitter is activated by applying an electrical potential between said first and second electrodes, thereby irradiating said first junction via said first optical path and electrically connecting said output electrode and said first wiring line, and said second light-emitter is activated by applying an electrical potential between said third and fourth electrodes, thereby irradiating said second junction via said second optical path and electrically connecting said second wiring line and said input electrode.

8. A visual information processing device as in claim 7, further comprising a plurality of image input elements, each coupled to one of said neuronic circuit regions.

9. A visual information processing device as in claim 8, further comprising a third junction including said first wiring line, said second wiring line, and a portion of a photoelectric film between said first wiring line and said second wiring line;

a third light-emitter including a fifth electrode, a sixth electrode and a portion of said light-emitting film between said fifth electrode and said sixth electrode; and a third optical path between said third light-emitter and said third junction, wherein said first and said second wiring lines are electrically connected when said third light-emitter is activated by applying an electrical potential between said fifth and sixth electrodes, thereby irradiating said third junction via said third optical path.

10. A visual image processing device as in claim 7, said multilayer molecular film comprising a transparent insulating film having a first surface and a second surface opposite the first surface, wherein said light-emitting film is disposed on said first surface of said transparent insulating film, and said at least one photoelectric film is disposed on said second surface of said transparent insulating film.

* * * * *